United States Patent [19]

Dodge

[11] Patent Number: 4,608,086

[45] Date of Patent: Aug. 26, 1986

[54] MEMBRANE REMOVER/ETCHANT

[75] Inventor: Paul D. Dodge, Apple Valley, Minn.

[73] Assignee: Tennant Company, Minneapolis, Minn.

[21] Appl. No.: 644,856

[22] Filed: Aug. 27, 1984

Related U.S. Application Data

[62] Division of Ser. No. 459,238, Jan. 19, 1983, Pat. No. 4,469,525.

[51] Int. Cl.$^4$ .......................... C08K 3/00; C11D 7/08
[52] U.S. Cl. ...................................... 106/12; 106/311; 252/142; 252/143; 427/136
[58] Field of Search ................ 252/142, 143; 106/12, 106/311; 427/136

[56] References Cited

U.S. PATENT DOCUMENTS

| | | | |
|---|---|---|---|
| 145,971 | 12/1873 | Sawyer . | |
| 370,551 | 9/1887 | McCarthy | 252/143 |
| 1,494,147 | 5/1924 | Braun | 252/143 |
| 1,548,495 | 8/1925 | Varn Buhler | 252/143 |
| 2,382,865 | 8/1945 | Dittmar | 148/4 |
| 2,443,173 | 6/1948 | Baum et al. . | |
| 2,507,985 | 5/1950 | Kuentzel . | |
| 2,662,837 | 12/1953 | Duncan . | |
| 2,793,191 | 5/1957 | Streicher | 252/147 |
| 2,937,111 | 5/1960 | Leithauser . | |
| 3,019,194 | 1/1962 | Brite . | |
| 3,070,464 | 12/1962 | Levy | 134/41 |
| 3,179,609 | 4/1965 | Merison | 260/28 |
| 3,218,260 | 11/1965 | Lewandowski | 252/142 |
| 3,291,743 | 12/1966 | Bost et al. | 252/143 |
| 3,330,769 | 7/1967 | Golben | 252/143 |
| 3,391,085 | 7/1968 | Crockett | 252/143 |
| 3,494,795 | 2/1970 | Chang | 134/40 |
| 3,538,007 | 11/1970 | Cooper et al. | 252/144 |
| 3,574,123 | 4/1971 | Laugle | 252/143 |
| 3,629,004 | 12/1971 | Cooper et al. | 134/31 |
| 3,743,542 | 7/1973 | Cooper et al. | 134/31 |
| 3,793,221 | 2/1974 | Otrhaler et al. | 252/136 |
| 3,871,929 | 3/1975 | Schevey et al. | 156/2 |
| 3,909,437 | 9/1975 | Alexander et al. | 252/143 |
| 3,925,229 | 12/1975 | Bolsing | 252/144 |
| 4,060,496 | 11/1977 | Berliner | 252/171 |
| 4,181,623 | 1/1980 | Dillarstone et al. | 252/143 |
| 4,246,130 | 1/1981 | Koch | 252/143 |
| 4,469,525 | 9/1984 | Dodge | 252/143 |

OTHER PUBLICATIONS

Plant Engineering, Mar. 4, 1982, "Industrial Floor Protection".

*Primary Examiner*—Theodore Morris
*Attorney, Agent, or Firm*—Kinzer, Plyer, Dorn & McEachran

[57] ABSTRACT

The present invention relates to a membrane remover/etchant solution including an organic solvent, a strong ionizable acid, a weak acid and an acid stable surfactant. The present invention further includes a method for removing a membrane and etching a concrete surface in which the membrane remover/etchant solution is in an organic solvent system and is applied to the concrete in an inactive acid form and then water is applied to activate the acid. The resulting materials are then picked up and the surface is rinsed with water.

22 Claims, No Drawings

MEMBRANE REMOVER/ETCHANT

This is a division of application Ser. No. 459,238, filed Jan. 19, 1983, now U.S. Pat. No. 4,469,525.

BACKGROUND OF THE INVENTION

The present invention relates to a composition for use in removing the membrane from concrete and etching the concrete in preparation for coating. More particularly the present invention provides a system for membrane removal and/or etching concrete.

It is well recognized that concrete should be etched prior to applying coatings such as polyurethane and the like. In the past concrete has been etched by first treating the surface with an acid composition such as muratic acid. The acid step is then followed by a neutralization, for example, using a sodium hydroxide solution. The neutralized materials are then lifted and the surface dried. Such prior etching processes have been very time consuming in view of the multiple steps. Also, such prior processes have been somewhat difficult for nontrained personnel to carry out since the acid tends to continue to etch until neutralized thus limiting the amount of surface which can be treated with the acid step before going back and neutralizing the acid. Moreover the further step of water washing and picking up the residues further extends the time required for etching concrete. The present invention overcomes such disadvantages by providing a single step membrane remover/etchant system which may be applied by a machine which simultaneously applies water and also picks up the residues or by well known manual methods.

The usual practice in pouring concrete surfaces such as floors is to apply a membrane to the surface. The membrane holds in moisture thus assuring complete curing of the concrete. Illustrative materials used to form the curing membrane are thin coatings (e.g. continuous films of 1 to 3 mils.) of chlorinated rubbers, oleo resins, acrylic resins and a combination of rubber and epoxy resin. Of course the membrane must be removed before the concrete can be etched. In the past membranes have been removed by sand blasting. Sand blasting however requires additional equipment and the sand blasting often results in an uneven surface due to eating away of softer areas of the concrete. Use of solvents to remove the membrane has been found to be the more acceptable method. Solvent removal of the membrane has its own problems and disadvantages. For example, solvent removal requires substantial additional time. Time for applying the solvent, time for the solvent to act, time for picking up the solvent and membrane materials, time for flushing the surface with water and time for the surface to dry enough (e.g. Delmhorst Moisture Meter reading of 20 or lower) to permit application of the finish coating material. Of course the concrete must also be etched.

The present invention overcomes the difficulties encountered in prior processes and provides a single process to both remove the membrane and etch the concrete.

GENERAL DESCRIPTION OF THE PRESENT INVENTION

The present invention provides a single process membrane remover and etchant solution including a strong acid (e.g. hydrochloric acid), an organic solvent (e.g. methylene chloride), a co-solvent (e.g. butoxyethanol), a weak organic acid (e.g. hydroxyacetic acid) and a surfactant. The organic solvent system used is compatible with water. The term "compatible" here means that the solvent system forms stable suspensions, emulsions and/or solutions.

In the process of the present invention the membrane remover/etchant solution is applied to the membrane which covers the concrete. The solution is permitted to work until the membrane is loosened and disintegrated. The solution-covered surface is then sprayed with water to activate the acids and the acids etch the concrete surface. Once etching is accomplished the surface is flooded with water and the water is picked up such as with a mobile scrubbing machine.

The present membrane remover/etchant solution includes a solvent of a type that dissolves or removes membrane material, e.g. chlorinated rubbers, oleo resins, acrylic resions, combinations of rubber and epoxy resin and the like. The solvent has a KB (Kurl-butanol test) value of at least 89, preferrably about KB92. The solvent preferrably has a high flash point, for example, about 150° F. for safety purposes. The solvent is also desirably of a type that readily evaporates without producing a hazardous condition. The solvent desirably is a chlorinated hydrocarbon, such as methylene chloride. The solvent may be compatible, e.g. completely soluble in the co-solvent used but may be insoluble in water. The solvent may act as an inhibitor (e.g. inhibits mobility of the hydrogen ion of the acid) for the strong acid present in the solution. The solvent desirably is of a type suitable for use as a cleaning agent for greases, oils, rubber and other materials commonly found around a construction site. The preferred solvent is methylene chloride. Other suitable chlorinated hydrocarbon solvents include ethylene dichloride, trichloroethylene, propylene dichloride, perchloroethylane, and o-dichlorobenzene. Suitable non-chlorinated solvents include hiflash naphtha and $C_9$ aromatic hydrocarbon solvents. Specific suitable solvents include benzene, ethylbenzene, toluene and xylene. Illustrative suitable commercial solvents are the following. WC 150 from Worum Chemical Company, Aromatic 150 from Exxon Oil Company, Cyclo Sol 63 from Shell Oil Company, and Hi Sol 15 from Ashland Chemicals.

The present solution includes a second solvent which serves as a co-solvent. The co-solvent has a high water solubility and a high organic solvent solubility. The preferred co-solvent is butoxyethanol. The co-solvent facilitates dissolving of the first solvent, e.g. methylene chloride, in the co-solvents and acids present in the solution. Other suitable co-solvents include isobutyl alcohol, octyl alcohol, isopropyl alcohol, methyl alcohol, carbitols, di-propylene methyl ether and the like.

Strong acids such as hydrochloric, sulfuric, nitric and the like are generally relatively inactive until placed in a aqueous environment where ionization can take place. In the present invention the acids are maintained in an inactive state until the solvents have removed the membrane. The water content of the present membrane remover/etchant solution is minimized and thus the acid activity is minimized until after the solution has been placed on the concrete surface and the solvents have removed the membrane. The acids present in the membrane remover/etchant solution are of a concentrated form having little water present. Of course some water is present; however, the total water level is preferrably below that at which etching will take place. The total water level is below 30% and generally below 20%. The preferred water level is about 13%, by weight. The preferred acid in the present invention is a combination of hydrochloric acid and hydroxyacetic acid. However, any of various other acids may be used so long as the acid is compatible with the other materials present in the membrane remover/etchant solution and providing the acid is suitable for etching concrete. The acid should be of type relatively safe in use. In the preferred embodiment both a concentrated strong acid and a weak organic acid such as an aliphatic acid are present. Suitable strong acids include hydrochloric, sulfuric, nitric, sulfurous acids and the like. The strong acid provides a high instantaneous hydrogen ion concentration with a high capacity of replaceable hydrogen. The strong acid has rapid aggressive etching action once water is added. The weak acid also serves as an etchant when water is later added. The weak acid may act as a co-solvent and as a differentiating solvent to inhibit the strong acid until water is later added. A preferred weak acid is hydroxyacetic acid. Other suitable weak acids include acetic, citric, dichloroacetic, sulfamic, and the like. Various other acids may be used. It is to be recognized that while the acids are in the organic solvent with little water present, little ionization of the acids takes place. However, once water is combined ionization takes place and the acid is activated to etch the concrete surface.

One or more surfactants may be included in the present solution to assure uniform distribution of the solution thereby completely wetting the surface. Any surfactant may be used which is compatible with the other components of the present solution including the strong acid environment, e.g. pH in the range of about 0 to 1. Nonionic and anionic surfactants are generally suitable. Illustrative nonionic surfactants useful in the present invention are nonylphenol; -4-mole ethylene oxide adduct (e.g. T-Det N-4 TM); nonylphenol; -9.5-mole ethylene oxide adduct (e.g. T-Det N-9.5 TM); nonylphenoxy polyethylene ethanol (e.g. Igepal CO-630 TM); polyethylene glycol ether of secondary alcohol (e.g. Tergitol 15-S-7 TM, Tergitol 15-S-9 TM and Tergitol 15-S-3 TM from Union Carbide); octylphenoxy ethanol (e.g. Triton X-100 TM) and nonylphenoxy ethanol (e.g. Polytergent B-300 from Olin Corp.). Illustrative anionics suitable for use include isopropylamine dodecylbenzene sulfonate (e.g. Richanate YLA produced by Richardson); modified ethoxylate chain length of 4–18 carbon atoms (e.g. Triton DF20 produced by Rohm & Haas); cycloaliphatic $C_{21}$ dicarboxylic acid (e.g. Diacid 1550 produced by West Vaco); straight chain dodecylbenzone (e.g. Conoco Detergent SA-597 produced by Conoco Oil Company) and free acid of a complex organic phosphate ester (e.g. GAFAC RA-600 produced by GAF Corp.). Some amphoteric surfactants are suitable such as Monoteric LF Na 50 (sodium salt of 2-alkyl imidazoline amphoteric produced by Mona Industries) and Cycloteric MV-SF (caprylic dicarboxylate imidazoline derivative produced by Cyclo Chem).

The membrane remover/etchant solution of the present invention may be in the form of a concentrate including, by weight 1 to 10 parts organic solvent, 30 to 50 parts co-solvent, 1 to 5 parts acid stable surfactant and 25 to 50 parts acid. The amount of materials herein will be expressed in "parts by weight" unless otherwise specifically stated. The acid preferably includes 5 to 20 parts weak organic acid and 20 to 30 parts strong acid. The water content of the solution is sufficiently low that the acid remains relatively inactive. The concentrate may be used as is if the membrane is of a type easily removed or if the concrete has no membrane and the present solution is used solely as an etchant. If the membrane is of a type difficult to remove, a further solvent may be added for example any solvent with a high KB value such as 89 plus. Aromatic solvents are considered suitable. The added solvent may be in any desired amount so long as the acid concentration does not fall below an effective amount. The added solvent may be in an amount equal to the amount of concentrate. The added solvent facilitates rapid membrane removal.

Once the concentrate or concentrate plus added solvent has been applied and any membrane removed, water is added for example by spraying water on the surface. The water will typically be added in an amount equal to the amount of concentrate. The water may be added at greater or lesser amount (e.g. twice the amount of concentrate) so long as the water provides sufficient ionization to make the acid effective for etching and so long as the acid is not diluted to the point that etching is inefficiently slow. Desirably the etching takes place in 10 to 60 minutes. This combination is permitted to act on the concrete until adequate etching has occurred. The concrete surface is then flushed with water and the water, solution, dissolved and suspended materials are picked up such as with a vacuum squeegee.

EXAMPLE I

A membrane remover/etchant solution was prepared according to the present invention by combining by weight 25 parts concentrated hydrochloric acid, 25 parts hydroxyacetic acid, 5 parts anionic surfactant, 10 parts dipropylene glycol methyl ether, 15 parts 2-butoxyethanol, 5 parts nonionic surfactant and 15 parts methylene chloride. The combination formed a stable storable nonaqueous solution here identified as Part A. Part B comprising 100 parts KB92 aromatic solvent was then added to Part A. The resulting solution was applied to a membrane covered concrete slab to wet the surface. The membrane was a thin film of chlorinated rubber of a type commonly used on commercially poured concrete slabs. The solution was applied at a thickness of about 16 mils. The solution loosened and removed the membrane. One hundred parts water was applied to activate the acid system and the etchant was permitted to work for between 10 and 15 minutes. The etchant was then picked up by a wet vacuum squeegee. The concrete surface was subsequently water rinsed sufficiently to return the concrete to a pH level of about 8. A satisfactory membrane removal and an etching of the concrete resulted.

EXAMPLE II

A solution was prepared according the present invention includng by weight 10 parts methylene chloride, 45 parts butoxyethanol, 3 parts nonionic surfactant (Igepal CO-430), and 2 parts nonionic surfactant (Igepal CO-630), 15 parts hydroxyacetic acid and 25 parts concentrated hydrochloric acid. The solution was combined with 100 parts aromatic hydrocarbon solvent and the combination was applied to an acrylic film membrane contained on a concrete slab in a manner substantially as described in Example I. After the membrane was removed one hundred parts water was sprayed onto the concrete. Excellent removal of the membrane and etching was obtained without saturating the concrete slab. The moisture content of the concrete surface was recorded as 17 on a Delmhurst Moisture Meter upon pickup of solution by the vacuum squeegee.

EXAMPLE III

A solution was prepared according to the present invention including by weight 10 parts methylene chloride, 20 parts 2-butoxyethanol, 10 parts dipropylene glycol methyl ether (Propysol DM), 40 parts concentrated hydrochloric acid, 10 parts hydroxyacetic acid, 5 parts nonionic surfactant (Igepal CO-430) and 5 parts nonionic surfactant (Igepal CO-630). A highly satisfactory membrane remover/etchant solution resulted. The solution was tested as described in Example I but on an acrylic membrane. The present solution was found to provide more bite.

EXAMPLE IV

A solution was prepared according to the present invention including by weight 10 parts methylene chloride, 45 parts 2-butoxyethanol, 1.2 nonionic surfactant (Igepal CO-630), 1.8 parts nonionic surfactant (Igepal CO-430), 15 parts hydroxyacetic acid and 27 parts concentrated hydrochloric acid. Concrete floor portions having membranes of various commercially available materials were treated. The portions were treated as described in Example I with highly satisfactory results being obtained. The membrane on the first floor portion was acrylic of the type produced by Brock White under the trademark Cure and Seal. The second portion had a membrane of chlorinated rubber (Master Seal 66 TM). The third concrete portion had a membrane which was a combination of chlorinated rubber and epoxy resin (Tricoat 18 TM). The fourth portion had a membrane of oleo resin.

EXAMPLE V

A membrane remover/etchant solution was prepared according to the present invention as described in Example I but including by weight 10 parts hydroxyacetic acid, 15 parts hydrochloric acid, 2.5 parts nonylphenol-4-mole ethylene oxide adduct nonionic surfactant (T-Det N-4 TM), 1.5 nonylphenol-9.5-mole ethylene oxide adduct nonionic surfactant (T-Det N-9.5 TM), 40 parts 2-butoxyethanol, 10 parts methylene chloride, and 21 parts isopropyl alcohol. This solution was then combined with 100 parts aromatic solvent (KB92). The combination was applied to a membrane covered concrete slab to wet the surface. The solution was permitted to act on the membrane until the membrane was disintegrated. Approximately 100 parts of water was then sprayed onto the surface and etching continued for about 15 minutes. The materials were then picked up from the concrete slab and the slab was water rinsed to a pH of about 8. A satisfactory removal of the membrane and etching suitable for subsequent coating of the concrete resulted.

EXAMPLE VI

A solution was prepared according to the present invention including 10 parts methylene chloride, 20 parts isopropyl alcohol, 20 parts 2-butoxyethanol, 20 parts cellosolve acetate, 2.5 parts nonylphenol nonionic detergent (T-Det N-4 TM), 1.5 parts nonylphenol nonionic surfactant (T-det N-9.5 TM), 10 parts hydroxyacetic acid, and 16 parts hydrochloric acid. A membrane containing concrete slab was treated with this solution as described in Example V obtaining satisfactory membrane removal and etching of the concrete floor.

EXAMPLE VII

The following solution was prepared according to the present invention: 5 parts methylene chloride, 25 parts hydroxyacetic acid, 25 parts hydrochloric acid, 10 parts diethyleneglycol methyl ether, 15 parts 2-butoxyethanol, 5 parts isopropylamine dodecylbenzene sulfonate anionic surfactant, and 5 parts nonylphenoxy nonionic surfactant. This solution was tested as described in Example V obtaining satisfactory results for membrane removal and etching of the concrete.

EXAMPLE VIII

A solution was prepared according to the present invention including 15 parts dipropylene glycol methyl ether, 2 parts nonylphenoxy nonionic surfactant, 47 parts hydroxyacetic acid, 32 parts hydrochloric acid, and 4 parts phosphoric acid. The solution was tested as described in Example V obtaining suitable membrane removal and etching of the concrete.

EXAMPLE IX

A solution was prepared according to the present invention including 50 parts formic acid, 10 parts perchloroethylene, 2 parts nonionic surfactant (eth oxide 4), 3 parts nonionic surfactant (eth oxide 6), 35 parts isopropyl alcohol. The solution was tested as described in Example I. The solution was found to be a satisfactory membrane remover/etchant solution.

EXAMPLE X

A solution was prepared according to the present invention including 50 parts phosphoric acid, 10 parts propylene dichloride, 3 parts nonionic surfactant (Polytergent B-300 TM), 2 parts anionic surfactant (Richanate YLA TM) and 35% methyl alcohol. The solution was tested as described in Example I and found to be a satisfactory membrane remover/etchant solution.

EXAMPLE XI

Various solutions were prepared acccording to the present invention as disclosed in Table I for preparing concentrate solutions A through S. Each of the solutions were tested as described in Example I. The solutions adequately removed the membrane and etched the concrete. The concrete was then suitable for coating.

TABLE I

SOLUTIONS

| INGREDIENTS | A | B | C | D | E | F | G | H | I | J | K | L | M | N | O | P | Q | R | S |
|---|---|---|---|---|---|---|---|---|---|---|---|---|---|---|---|---|---|---|---|
| HCl 38% | 20 | 20.8 | 25 | 25 | | 6 | 10 | 25 | 25 | 40 | 48 | 46 | 32 | 50 | 50 | 25 | 40 | 27 | 17 |
| Hydroxyacetic | 20 | 20.8 | 25 | 25 | 25 | 25 | 34 | 25 | 30 | 40 | 48 | 46 | 47 | | 10 | 15 | 10 | 15 | |
| hydrofluoric | 2 | 1.7 | | | | | | 6 | 10 | | | | | | | | | | |
| sulfamic | | | | | | 6 | 6 | | | | | | | | | | | | |
| para-sulfonic | | | | | | 2 | 2 | | | | | | | | | | | | 7 |
| phosphoric | | | | | | | | | | | | | | | | | | | |
| acetic | | | | | 25 | | | | | | | 4 | 4 | 14 | 14 | | | | |
| citric | | | | | | | | | | | | | | 20 | | | | | |
| formic | | | | | | | | | | | | | | 15 | | | | | |
| ammonium hydroxide | 10 | | | | | | | | | | | | | | | | | | |
| water | 8 | 8.3 | | | | 38 | 35 | 30 | 30 | 15 | | | | | 0.5 | | | | 17 |
| ethylene glycol | | | 15 | 15 | 15 | 15 | | | | | | | | | 23.5 | | | | |
| monomethyl ether acetate | | | | | | | | | | | | | | | | | | | |
| ethylene glycol monobutyl ether | 8 | 9.4 | | | | | | | | | | | | | | 45 | 20 | 45 | 4.5 |
| Cellosolve solvent | | | | | | | 8 | 9 | | | | | | | | | | | |
| Cellosolve acetate | | | 10 | 15 | 10 | | | | | | | | | | | | | | |
| Methylene Chloride | 8 | 8.3 | | | | | | | | | | | | | | 10 | 10 | 10 | 17 |
| mineral spirits | 8 | 8.3 | | | | | | | | | | | | | | | | | 16 |
| ISO butyl alcohol | 8 | 8.3 | | | | | | | | | | | | | | | | | |
| Isopropyl alcohol | | | | 15 | 15 | | | | | | | | 15 | | | | | | 17 |
| D/M propasol | | | | | | | | | | | | | | | | | | | |
| D/P/M solvent | | | | | 100 | | | | | | | | | | | | 10 | | |
| aromatic KB +90 | 100 | 100 | 100 | 100 | | 100 | 100 | 100 | 100 | 100 | 100 | 100 | 100 | 100 | 100 | 100 | 100 | 100 | 100 |
| nonionic (EO content = 4) | 2.4 | 2.5 | | | | | | 3 | 5 | 3 | | | 2 | | | 3 | 5 | 1.8 | 2.7 |
| nonionic (EO content = 6) | 1.6 | | | | | | 3 | 3 | | | | | | | 2 | 2 | 5 | 1.2 | 1.8 |
| nonionic (EO content = 9) | | | | 5 | | | | | | | 4 | 4 | | 1 | | | | | |
| nonionic (EO content = 10) | 4 | 3.3 | 5 | | 5 | | | | | | | | | | | | | | |
| sulfonic acid | | | | | | 4 | 2 | 2 | | | | | | | | | | | |
| amide | | 8.3 | 5 | | 5 | | | | | | | | | | | | | | |
| carboxolate | | | | | | 4 | | | | | | | | | | | | | |

I claim:

1. A precoating membrane remover/etchant composition for treating concrete covered with a thin moistureproof organic membrane, first to dissolve the membrane and, after dissolving the membrane, to etch the concrete provided an etching acid in said solution is activated for the concrete etching role, said composition comprising by weight (a) from 1 to 10 parts organic solvent, and 30 to 50 parts a co-solvent therefor, for dissolving the membrane, and said co-solvent also serving the role of a strong acid inhibitor; (b) 5 to 20 parts concentrated weak carboxylic organic acid and 20 to 30 parts concentrated strong mineral acid together with a water content which is insufficient in combination with said solvents to allow substantial ionization of the acid to the effective concrete etching state; said weak acid along with said co-solvent also serving the role of inhibitor for the strong acid; and said solution further comprising (c) a surfactant to induce uniform wetting of the solution when applied to the membrane; said solution being capable of dissolving an organic membrane on a concrete slab, whereafter by adding additional water to said solution the acids become activated effectively to etch the exposed concrete.

2. The solution of claim 1 wherein said water content is 20% or lower.

3. The solution of claim 1 wherein said water content is about 13%.

4. The solution of claim 1 wherein said strong acid is a member selected from the group consisting of hydrochloric acid, sulfuric acid, nitric acid, and sulfurous acid.

5. The etchant of claim 1 wherein said weak organic acid is hydroxyacetic acid.

6. The etchant of claim 2 wherein said weak organic acid is hydroxyacetic acid.

7. A precoating membrane remover/etchant concentrate for treating a concrete surface first to remove an organic membrane thereon and then to etch the concrete, said concentrate consisting essentially in parts by weight of from 1 to 10 parts methylene chloride and 30 to 50 parts butoxyethanol to remove the membrane; 1 to 5 parts acid stable surfactant to assure uniform distribution of the concentrate and wetting of the surface; 5 to 20 parts hydroxyacetic acid and 20 to 30 parts strong acid, said strong acid being a member selected from the group consisting of hydrochloric acid, sulfuric acid, nitric acid, and sulfurous acid, said hydroxyacetic acid being a weak acid which inhibits ionization of the strong acid until sufficient water is added to activate the acid to its concrete etching role.

8. The concentrate of claim 7 wherein an equal amount of an aromatic solvent having a KB value of at least 89 is combined.

9. The concentrate of claim 7 wherein said hydroxyacetic acid is present in an amount of 15 parts and said hydrochloric acid is present in an amount of 27 parts, by weight.

10. The etchant concentrate of claim 7 wherein said detergent is nonionic and is present in an amount of 3 parts, by weight.

11. The concentrate of claim 7 wherein said methylene chloride is present in an amount of 10 parts by weight.

12. The etchant concentrate of claim 7 wherein said methylene chloride is 10 parts, said butoxyethanol is 45 parts, said detergent is 3 parts, said hydroxyacetic acid is 15 parts and said hydrochloric acid is 27 parts, by weight.

13. Composition according to claim 1 wherein the strong acid is a mineral acid including hydrochloric acid, wherein the weak acid is hydroxy acetic acid, and wherein the solvent remover includes a hydrocarbon solvent of KB value at least 89.

14. The etchant concentrate of claim 7 including by weight 10 parts methylene chloride, 15 parts 2-butoxyethanol, 6 parts nonionic surfactant, 15 parts hydroxyacetic acid and 25 parts hydrogen chloride.

15. Composition according to claim 1 in which the first-named solvent comprises methylene chloride, ethylene dichloride, trichloroethylene, propylene, dichloride, perchloroethylene, o-dichlorobenzene, benzene, toluene, or xylene and, as co-solvent therewith, butoxyethanol, isobutyl alcohol, octyl alcohol, isopropyl alcohol, methyl alcohol, carbitol, or di-propylene methyl ether; in which the strong acid comprises hydrochloric acid, sulfuric acid, sulfurous acid, or nitric acid; and in which the weak acid comprises hydroxyacetic acid, oxalic acid, acetic acid, dichloroacetic acid or sulfonic acid.

16. A composition to remove thin membrane film material applied to freshly poured concrete to effect moisture retention and optimize the cure of the concrete, and at the same time to prepare the concrete for subsequent application of a finish coating by acid etching the concrete surface in a one-step continuous process, said composition comprised of three component parts (A, B, C), Part A:
(1) from 1–10 parts by weight of chlorinated liquid hydrocarbon solvent selected from the group consisting of methylene chloride, ethylene dichloride, trichloroethylene, propylene dichloride, perchloroethylene, and ortho dichlorobenzene;
(2) from 6–40 parts by weight of a concentrated inorganic acid selected from the group consisting of hydrochloric, sulfuric, nitric, sulfurous, phosphoric, and sulfonic acids;
(3) from 10–48 parts by weight of a concentrated water soluble carboxylic aacid having 2-6 carbon atoms and selected from the group consisting of hydroxyacetic, acetic, and citric acids;
(4) from 8–45 parts by weight of a cosolvent selected from the group consisting of mono and dialkyl ethers of diethylene and propylene glycol and their derivatives and lower alcohols up to C-8;
(5) from 1–5 parts by weight of a wetting agent;
Part B:
from 10–100 parts of an aromatic hydrocarbon solvent with a KB value at least 89;
Part C:
from 13–100 parts water, wherein when said parts A and B are applied to said surface, said solvents loosen and dissolve said membrane film, and subsequently, the part C addition of water activates said acids to etch the said concrete surface and ready it for application of the finish coating.

17. The composition of claim 16 wherein the chlorinated liquid hydrocarbon solvent is methylene chloride, the inorganic acid is hydrochloric acid, and the carboxylic acid is hydroxyacetic acid.

18. The composition of claim 16 consisting essentially of:

Part A:
  (1) from 1-10 parts by weight of methylene chloride;
  (2) from 6-40 parts by weight of hydrochloric acid;
  (3) from 10-48 parts by weight of hydroxyacetic acid:
  (4) from 8-45 parts by weight of 2-butoxyethanol;
Part B:
  from 10-100 parts by weight of aromatic hydrocarbon C-8 or higher solvent;
Part C:
  from 13-100 parts water.

19. The composition of claim 16 consisting essentially of:
Part A:
  (1) from 1-10 parts by weight of methylene chloride;
  (2) from 10-30 parts by weight of hydrochloric acid;
  (3) from 10-20 parts by weight of hydroxyacetic acid;
  (4) from 30-45 parts by weight of 2-butoxyethanol;
Part B:
  from 60-100 parts by weight of aromatic hydrocarbon C-8 or higher solvent;
Part C:
  from 13-100 parts water.

20. The composition of claim 16 in which subdivision (5) of Part A is 1-5 parts by weight of a wetting agent selected from the group consisting of a nonylphenol with 4-14 moles of ethylene oxide adducts, a polyethylene glycol ether with 4-15 moles of ethylene glycol adducts; polyethoxylated straight chain alcohols, isopropylomine dodecylbenzene sulfonate, an ethoxylate of chain length 4-18 carbon atoms, cycloaliphatic C-21 dicarboxylic acids, straight chain dodecylbenzene and free acid complex organic phosphate ethers.

21. The composition of claim 19 in which the wetting agent of PART A includes from 1-2 parts by weight of a mixture of nonylphenol with 6 moles of ethylene oxide adduct and from 1-3 parts by weight of nonylphenol with 4 moles of ethylene oxide adduct.

22. A coating remover/etchant concentrate for removing an organic coating, such as a chlorinated rubber membrane, from a concrete surface and for subsequently etching the concrete surface, said concentrate consisting essentially of a sufficient amount of an organic solvent to disintegrate the coating and a mineral concentrated strong acid combined with a weak carboxylic organic acid by which the strong acid is inhibited against ionization, insufficient water in the concentrate to activate the acids, but said acids being capable of being activated by the addition of water, and said acids being present in an amount sufficient, when activated, to etch the concrete surface.

* * * * *